US008131456B2

(12) United States Patent
Mahalingaiah et al.

(10) Patent No.: US 8,131,456 B2
(45) Date of Patent: Mar. 6, 2012

(54) VEHICLE MANAGEMENT SYSTEM

(75) Inventors: Pradeep Mahalingaiah, Karnataka (IN); Ranga Udipi, Karnataka (IN)

(73) Assignee: Honeywell International Inc., Morristown, NJ (US)

(*) Notice: Subject to any disclaimer, the term of this patent is extended or adjusted under 35 U.S.C. 154(b) by 720 days.

(21) Appl. No.: 12/236,365

(22) Filed: Sep. 23, 2008

(65) Prior Publication Data

US 2010/0073124 A1 Mar. 25, 2010

(51) Int. Cl.
*G06F 19/00* (2011.01)

(52) U.S. Cl. ............ 701/117; 701/29; 701/36; 340/438; 340/459

(58) Field of Classification Search .................... 701/29, 701/33, 36, 117; 340/438, 439, 457.4, 426.24, 340/459, 539.24
See application file for complete search history.

(56) References Cited

U.S. PATENT DOCUMENTS 6,370,454 B1 4/2002 Moore
6,677,854 B2 * 1/2004 Dix ............................... 340/438
6,707,378 B2 * 3/2004 MacNeille et al. ........... 340/435
7,103,456 B2 9/2006 Bloch et al.
7,295,925 B2 11/2007 Breed et al.
2005/0065678 A1 * 3/2005 Smith et al. ..................... 701/29
2005/0228558 A1 10/2005 Valette et al.
2007/0139169 A1 6/2007 Mitchell et al.

FOREIGN PATENT DOCUMENTS

EP 1197822 A2 4/2002
GB 2429819 A 3/2007

OTHER PUBLICATIONS

EP Search Report dated Jan. 7, 2010, EP 09170347.0-2215.

* cited by examiner

*Primary Examiner* — Gertrude Arthur Jeanglaude
(74) *Attorney, Agent, or Firm* — Ingrassia Fisher & Lorenz, P.C.

(57) ABSTRACT

A system for controlling a fleet of vehicles includes a plurality of detection units and a control unit. Each detection unit is configured to at least facilitate obtaining information as to a respective vehicle of the fleet. The control unit is coupled to the plurality of detection units, and is configured to at least facilitate providing one or more recommendations for one or more of the vehicles based at least in part on the information.

20 Claims, 6 Drawing Sheets

VEHICLE MANAGEMENT SYSTEM

TECHNICAL FIELD

The present invention relates to vehicles, and more particularly relates to management systems for vehicles.

BACKGROUND

In recent years, the transportation industry has been moving towards network-centric models using high-end technologies for better business opportunities and greater profit margin by optimizing operations of a fleet of vehicles, monitoring and improving their health status to reduce maintenance cost and providing more value added services to the end customers. Important management operations often include health monitoring of each of the components, their maintenance and repair, and maximizing the efficiency of these vehicles, among other operations. In addition, it is often also desirable to provide timely reporting of information related to the vehicle, such as, mileage, trip information, fluid status, and other parameters, as such real time health information can help to reduce the time that vehicles are at repair facilities. Large vehicle fleet owners often desire optimized capital investment on spares, better up-time of vehicles, faster turnaround time through quicker repair/spares maintenance for higher on-road utilization and ease of maintaining the vehicles by reducing repair costs. In addition, there are increasing needs today to access information faster and at various times and locations.

Accordingly, there is a need to provide methods, systems and computer products to control a fleet of vehicles, for example to further provide for effective maintenance through real-time health monitoring of fleet, optimized routing, operational efficiency and/or optimized capital investment on spares, fuel, manpower, and/or other items. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment of the present invention, a system for controlling a fleet of vehicles is disclosed. The system comprises a plurality of detection units and a control unit. Each detection unit is configured to at least facilitate obtaining information as to a respective vehicle of the fleet. The control unit is coupled to the plurality of detection units, and is configured to at least facilitate providing one or more recommendations for one or more of the vehicles based at least in part on the information.

In accordance with another exemplary embodiment of the present invention, a method for controlling a fleet of vehicles is disclosed. The method comprises the steps of obtaining information as to a vehicle in the fleet, obtaining additional information as to additional vehicles in the fleet, transmitting the information and the additional information to a control unit via a wireless network, and providing one or more recommendations for the vehicle based at least in part on the information and the additional information.

In accordance with a further exemplary embodiment of the present invention, a program product for controlling a fleet of vehicles is disclosed. The program product comprises a program and a computer-readable signal bearing medium. The program is configured to at least facilitate obtaining information as to a vehicle in the fleet, obtaining additional information as to additional vehicles in the fleet, transmitting the information and the additional information to a control unit via a wireless network, and providing one or more recommendations for the vehicle based at least in part on the information and the additional information. The computer-readable signal bearing medium bears the program.

DETAILED DESCRIPTION

Figure 1:
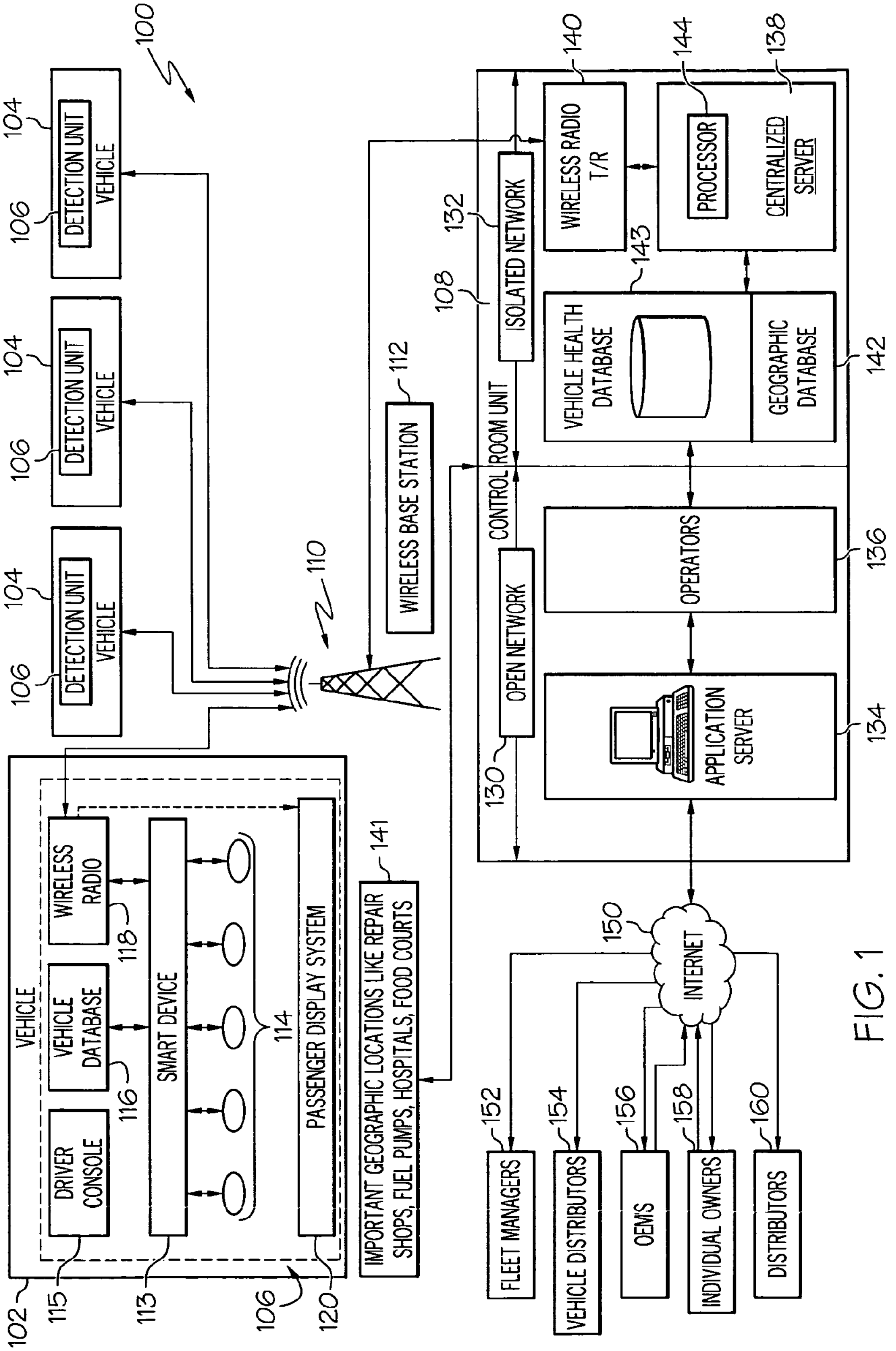
FIG. 1 is a functional block diagram of a control system for controlling a fleet of vehicles, in accordance with an exemplary embodiment of the present invention.

FIG. 1 is a functional block diagram of a control system 100 for controlling a fleet of vehicles, in accordance with an exemplary embodiment of the present invention. In the depicted embodiment, the fleet of vehicles includes a first vehicle 102 and a number of additional vehicles 104. In one exemplary embodiment, the first vehicle 102 and the additional vehicles 104 each comprise an automobile such as a sedan, a truck, a van, a sport utility vehicle, or another type of automobile, a ship, a water sports vehicle, a cargo vehicle, a barge, a transportation system, an airplane, a helicopter, a rocket, and/or any one of a number of different types of land vehicles, water vehicles, air or space vehicles, and/or other types of vehicles. In another exemplary embodiment, the first vehicle 102 and the additional vehicles 104 each comprise an automobile such as an airplane, a helicopter, a rocket, or another type of air or space vehicle. In yet another exemplary embodiment, the first vehicle 102 and the additional vehicles 104 each comprise a locomotive. In still other embodiments, the first vehicle and the additional vehicles 104 comprise one or more different types of vehicles. It will be appreciated that the number of first vehicles 102 and/or additional vehicles 104 may similarly vary in different embodiments.

Also in the depicted embodiment, the control system 100 comprises a plurality of detection units 106 and a control unit 108. Each detection unit 106 is configured to obtaining information as to a respective vehicle 102, 104 of the fleet and to provide such information to the control unit 108. In a preferred embodiment, the first vehicle 102 and each of the additional vehicles 104 of the fleet each have their own detection unit 106 that obtains and transmits information regarding such vehicle to the control unit 108 via a wireless network 110 and a wireless base station 112, as shown in FIG. 1. In a preferred embodiment, the wireless network 110 comprises a Wi-Max network. However, this may vary in other embodiments of the present invention.

The base station 112 preferably resides at a central location and keeps live connections with all of the vehicles of the fleet. Every vehicle hooked on the network will communicate with the centralized control room system, such as the control system 108 described further below. Some of the key features that could be offered by this solution in the proposed 'smart device' inside each vehicle are as listed in FIG. 2 and will be described further below in connection therewith and in connection with one exemplary embodiment of the present invention.

Figure 3:
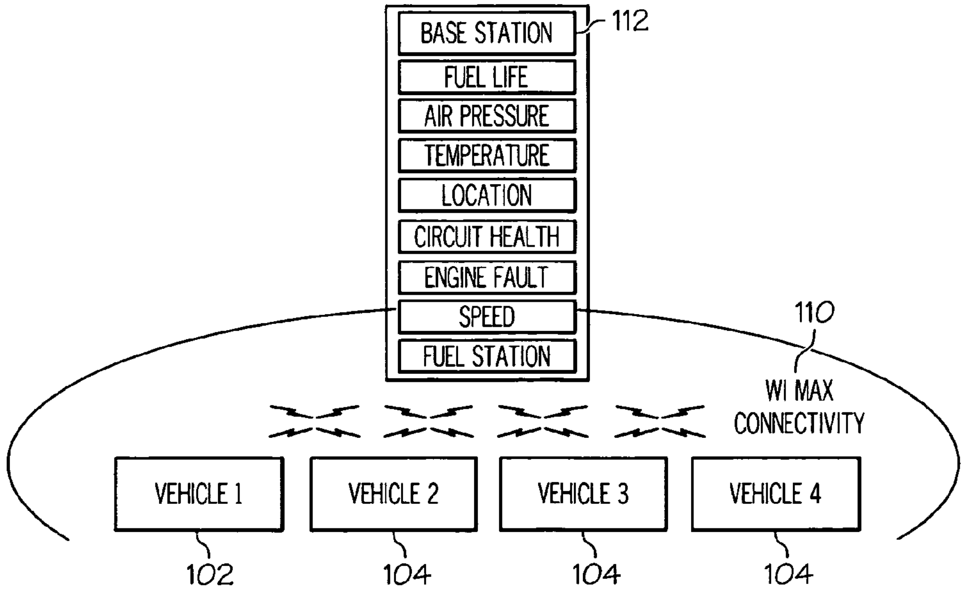
FIG. 3 is another functional block diagram of the control system of FIG. 1, in accordance with another exemplary embodiment of the present invention.

In a preferred embodiment, the base station 112 and the control system 100 in general would help in detecting faults and aid in reducing the occurrence by suggesting preventing actions. The vehicles are preferably connected to the base station 112 during the journey. At the system start-up, the health information of each vehicle will be sent to the base station 112, preferably by the wireless radios 118. The health information preferably includes vital information about the vehicle such as, by way of example only, the current location of the vehicle, the temperature of the engine, an emission level of the engine, a measure of an amount of fuel left, a measure of air pressure in the tires etc, for example as depicted in FIG. 3 and described below in connection therewith and in connection with an exemplary embodiment of the present invention.

Also in a preferred embodiment, the base station 112 and the control unit 108 preferably run diagnostic algorithms like it may compare the existing and optimum levels and detect the probable occurrence scenarios and inform the driver. The driver preferably receives information about the vehicle health from the base station 112. For instance, if the engine temperature rises above the recommended level which would result in engine failure, the driver would receive a warning message. Similarly if the air pressure is below the normal level the driver would be sent an alert message. The system would also help in monitoring the location of vehicle which would prohibit and misuse of the vehicle. The driver has to enter the source and destination at the start of journey along with few other parameters. The data would be sent to the base station 112 and the control unit 108 where running application would calculate the distance between the source and destination. The application preferably contains preconfigured average distances of various points in its repository. The journey distance is preferably calculated based on this data. It preferably estimates the fuel consumption for the journey by mining into past performance of the vehicle. The fleet group can monitor all vehicles on one single terminal like a control room, rather then talking to the drivers on radios. As described in greater detail below, the information is preferably obtained by the base station 112 and the control unit 108 by a detection unit 106 in each of the vehicles of the fleet in accordance with a preferred embodiment of the present invention.

In the depicted embodiment, the detection unit 106 for each vehicle in the fleet comprises a smart device 113, a driver console 115, a vehicle health database 116, a wireless radio 118, and a display 120. Each smart device 113 is preferably onboard its respective vehicle of the fleet. The smart device 113 for each vehicle in the fleet preferably makes a Wi-Max connection to a centralized server system in a control room of the control unit 108, for example that may be owned by the fleet organization. Each smart device 113 in turn communicates and fetches maintenance data from pervasive sensors fit around the vehicle. FIG. 1 below depicts the complete system architecture.

The smart device 113 preferably includes a plurality of sensors 114 that detect various values pertaining to information regarding the vehicle. For example, in certain exemplary embodiments, the sensors 114 detect values pertaining to a position of the vehicle, one or more performance values or operating values for the vehicle, values pertaining to one or more operating conditions or symptoms, one or more parameters indicative of one or more measures of vehicle health, and/or various other values.

The smart device 113 preferably obtains these values from the sensors 114, and also obtains additional values pertaining to the operation of the vehicle and related data from the driver console 115 and the vehicle health database 116 of the vehicle. In one exemplary embodiment, the driver console 115 provides one or more readings from a dash board (e.g. a speed, a temperature, an amount of fuel, an oil pressure, and/or various other values) of the vehicle, and the vehicle health database 116 includes historical values of these and/or other operating parameters, operating conditions, or other values pertaining to the vehicle, for example from previous time periods in which the vehicle was operating, maintenance records pertaining to vehicle, and/or other values.

The smart device 113 utilizes the values obtained from the sensors 114, the driver console 115, and the vehicle health database 116 in determining information pertaining to the vehicle. In a preferred embodiment, this information comprises one or more of the following: a geographic location of the respective vehicle, an emission level of the vehicle; an air pressure of one or more tires of the vehicle, an amount of fuel left in the vehicle, a temperature of the vehicle, an engine status of the vehicle, a transmission status of the vehicle, a path of the vehicle, one or more environmental conditions surrounding the vehicle, one or more environmentally friendly recommendations, real-time recommendations or services to passengers, and/or other values, information, and/or data pertaining to the vehicle. The smart device 113 provides the information or signals representative thereof to the wireless radio 118 of the detection unit 106 for transmission to the control unit 108.

The wireless radio 118 of each vehicle's detection unit 106 transmits a signal representative of the above-referenced information pertaining to the vehicle to the control unit 108. In addition, the wireless radio 118 of each vehicle's detection unit 106 receives recommendations from the control unit 108. In a preferred embodiment, the recommendations comprise one or more maintenance recommendations or recommended routes, or both, for the vehicle based at least in part on the information as well as similar additional information provided pertaining to the additional vehicles 104. In certain embodiments, the recommendations may also include any number of other different types of vehicle health or maintenance recommendations. In addition, in certain embodiments, the recommendations may include recommendations or other information pertaining to points of interest for the occupants of the vehicle, such as nearby hotels, restaurants, museums, sports venues, hospitals, attractions, or other points of interest. In yet other embodiments, any number of various other different types of recommendations may be provided, separate from or in addition to those noted above.

Figure 7:
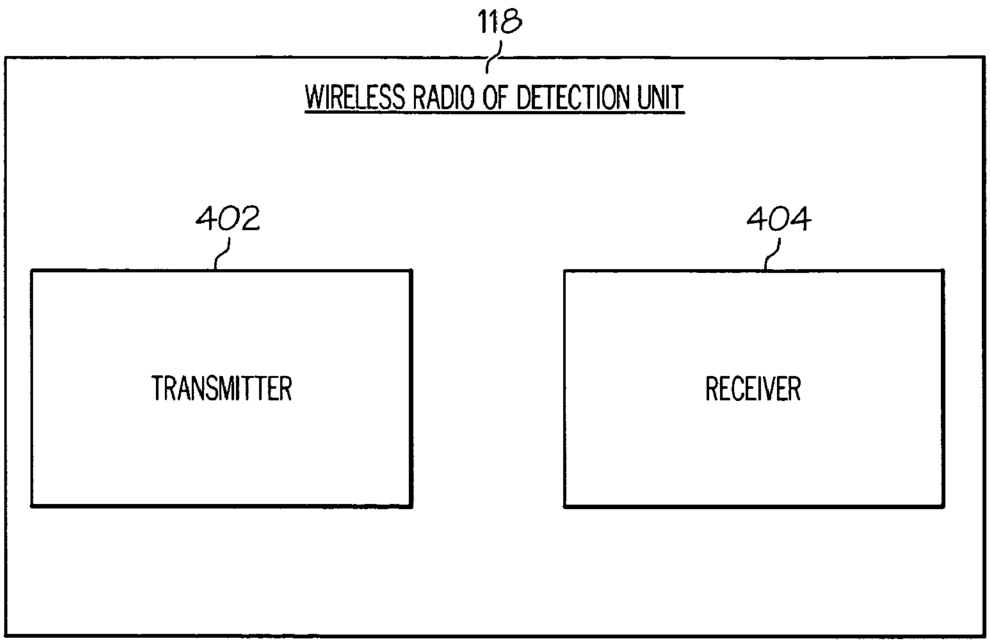
FIG. 7 is a functional block diagram of a wireless radio from a detection unit of the control system of FIG. 1, including a transmitter and a receiver thereof, in accordance with an exemplary embodiment of the present invention.

As shown in FIG. 7, each wireless radio 118 of each detection unit 106 preferably includes a transmitter 402 and a receiver 404. In one preferred embodiment, the transmitter 402 transmits the signals representative of the information pertaining to the vehicle to the control unit 108. Also in one preferred embodiment, the receiver 404 receives the recommendations from the control unit 108. It will be appreciated that other types of transmitters 402 and/or receivers 404 may also be utilized, and/or that a single transmitter/receiver may be utilized in certain embodiments, among various other variations in other embodiments.

Returning now to FIG. 1, the display 120 is coupled to the wireless radio 118, and displays notifications pertaining to the recommendations received by the wireless radio 118 from the control unit 108. For example, the notifications may include, by way of example only, recommendations for one or more maintenance recommendations or recommended routes, or both, for the vehicle, other different types of vehicle health or maintenance recommendations, and/or information pertaining to points of interest for the occupants of the vehicle, such as nearby hotels, restaurants, museums, sports venues, hospitals, attractions, or other points of interest.

In a preferred embodiment, each of the additional vehicles 104 includes a similar respective detection unit 106. Each of these detection units 106 of the additional vehicles 104 preferably similarly includes a respective smart device 113, respective sensors 114, a respective vehicle console 115, a respective vehicle health database 116, a respective wireless radio 118, and a respective display 120, each preferably with the same or similar components, functions, and features as those described above in connection with the detection unit 106 for the first vehicle 102. Each of these detection units 106 also similarly provides additional information as to these respective vehicles. In addition, each detection unit 106 preferably is disposed within or otherwise proximate to a respective vehicle of the fleet. Accordingly, each vehicle in the fleet is preferably connected as a moving node on the wireless network 110.

In a preferred embodiment, the control unit 108 utilizes the information from the first vehicle 102 and the additional information from each of the additional vehicles 104 in providing specific recommendations to the first vehicle 102 and to each of the additional vehicles 104. For example, in one preferred embodiment, the recommendations provided by the control unit 108 to the first vehicle 102 utilize the additional information from the additional vehicles 104 (for example, as to how the additional vehicles 104 are operating, the amount and nature of repairs and/or maintenance required, etc.) while also being tailored to the first vehicle 102 (for example, as to specific operation of the first vehicle 102, specific repairs and/or maintenance for the first vehicle 102, and/or a geographic position and/or path of the first vehicle 102, etc.).

In the depicted embodiment, the control unit 108 comprises a control room 108 having an open network 130 and an isolated network 132. In a preferred embodiment, the isolated network 132 communicates with the detection units 106 of each of the vehicles in the fleet, and the open network 130 communicates with various users of the control system 100, for example as described further below. In one exemplary embodiment, the use of an isolated network 132 and an open network 130 helps to ensure subscribers that any security concerns are being addressed and that only authenticated subscriptions are allowed to access data. Accordingly, private data can be accessed by the isolated network 132, while public data can be addressed via the open network 130.

Figure 8:
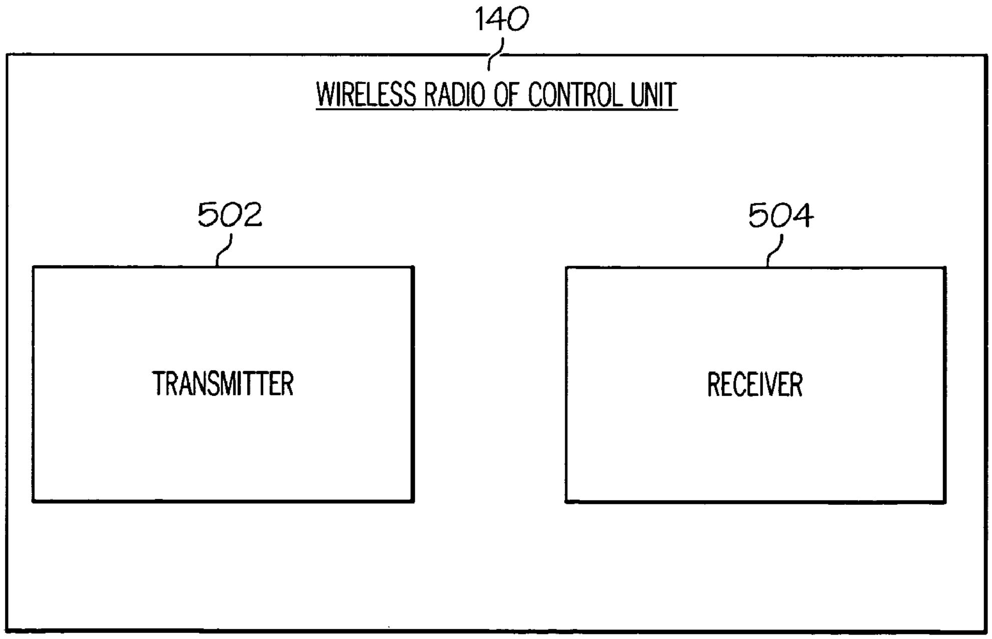
FIG. 8 is a functional block diagram of a wireless radio from a control unit of the control system of FIG. 1, including a transmitter and a receiver thereof, in accordance with an exemplary embodiment of the present invention.

In the depicted embodiment, the isolated network 132 includes a vehicle health database 143, a geographic database 142, a wireless radio 140, and a centralized server 138. As shown in FIG. 8, the wireless radio 140 of the isolated network 132 preferably includes a transmitter 502 and a receiver 504. In one preferred embodiment, the transmitter 502 transmits the recommendations from the control unit 108 to the detection units 106 of the different vehicles in the fleet. Also in one preferred embodiment, the receiver 504 receives the above-referenced information and additional information from the first vehicle 102 and the additional vehicles, 104, respectively, of the fleet.

In addition, in certain embodiments the receiver 504 also receives information as to geographic locations 141 of FIG. 1 near the vehicles and/or their respective paths, such as service stations, repair shops, fuel pumps, hospitals, restaurants hotels, attractions, museums, sports venues, and/or other points of interest from one or more outside sources, such as a non-depicted satellite and/or from one or more of the vehicles in the fleet. However, in one preferred embodiment, such information regarding such points of interest is obtained instead from the geographic database 142 of FIG. 1, for example by the centralized server 138 as described below. Also in a preferred embodiment, the geographic database 142 is also populated using data that is already available in a city's or other location's Geographic Information System (GIS). It will be appreciated that other types of transmitters 502 and/or receivers 504 may also be utilized, and/or that a single transmitter/receiver may be utilized in certain embodiments, among various other variations in other embodiments.

Returning again to FIG. 1, the centralized server 138 is coupled to the wireless radio 140. The centralized server 138 receives the information and additional information (collectively referred to as "vehicle information") from the wireless radio 140. This vehicle information preferably includes vehicle health monitoring data and other data and information pertaining to the vehicle. In addition, the centralized server 138 also preferably obtains additional information and data from the vehicle health database 145 and the geographic database 142. Specifically, in a preferred embodiment, this data and information include vehicle health data such as maintenance records and operating and performance records for the entire fleet of vehicles (collectively referred to as "vehicle health information") stored in the vehicle health database 145. In addition, also in a preferred embodiment, this data and information also include information as to geographic locations near the vehicles and/or their respective paths, such as service stations, repair shops, fuel pumps, hospitals, restaurants hotels, attractions, museums, sports venues, and/or other points of interest (collectively referred to as "geographic information") stored in the geographic database 142.

The centralized server 138 preferably includes a processor 144 that is coupled to the wireless radio 140, the vehicle health database 143, and the geographic database 142. The processor 144 obtains the vehicle information from the wireless radio 140 or other receiver 504, retrieves the vehicle health information from the vehicle health database 143, and retrieves the geographic information from the geographic database 142. The processor 144 processes the vehicle information, the vehicle health information, and the geographic information, and generates the above-referenced recommendations based thereon.

In a preferred embodiment, the processor 144 thus superimposes the vehicle information with the vehicle health information and/or the geographic information in making the recommendations for the different vehicles in the fleet. For example, in one exemplary embodiment, the processor 144 generates recommendations for the first vehicle 102 based at least in part on vehicle information pertaining to the first vehicle 102, as well as vehicle information pertaining to the additional vehicles 104 and/or historical data pertaining thereto and/or other vehicle health information stored in the vehicle health database 143.

Such recommendations may include, by way of example only, a recommended maintenance or repair service for the first vehicle 102 based on current operating symptoms of the first vehicle 102 (as represented by the vehicle information for the first vehicle 102) as well as historical maintenance and repair experiences and data of the fleet as a whole as represented in the vehicle health data (as stored in the vehicle health database 143). For example, if the vehicle information as to the first vehicle 102 indicates that the first vehicle 102 is experiencing reduced fuel efficiency and the vehicle health information indicates that other vehicles have had their fuel efficiency increased in similar situations after a certain type of tune-up, then the processor 144 may recommend that particular type of tune-up for the first vehicle 102 as part of the recommendations for that vehicle.

Current operating symptoms of the additional vehicles 104 (as represented by the vehicle information for the additional vehicles 104) may also be utilized in providing the recommendations for the first vehicle 102, for example as the operating symptoms or other data pertaining to the additional vehicles 104 may shed additional light on or help forecast future operating conditions and experiences for the first vehicle 102. For example, if the vehicle information for the additional vehicles 104 indicates that those vehicles have experienced tire wear after X miles or Y months of operation with the same tires and the vehicle information for the first vehicle 102 indicates that the first vehicle is approaching X miles or Y months of operation with the same tires, then the processor 144 may recommend tire replacement as part of the recommendations for the first vehicle.

In addition, the geographic data may also be used in providing the recommendations for the first vehicle 102. For example, if the vehicle data for the first vehicle 102 indicates that the first vehicle 102 is low on fuel and also indicates a current geographic position of the vehicle, then the geographic data preferably includes locations of nearby service stations, and the processor 144 preferably provides recommendations for the first vehicle 102 to proceed to one or more such nearby service stations. By way of another example, if the vehicle data for the first vehicle 102 indicates that the first vehicle 102 indicates that the first vehicle is travelling toward a location that is currently experiencing adverse weather or other environmental conditions (for example, based on the geographic information, such as a weather report, or the additional information from one or more of the additional vehicles that may have encountered or that may be currently encountering the adverse weather or other environmental conditions), then the processor 144 may recommend as part of the recommendations for the first vehicle 102 that the first vehicle 102 take an alternative route or take other measure (such as, for example, taking a rest stop if the conditions are believed to be short in duration, putting on tire chains in snowy weather, and/or various other possible recommendations for different types of environmental conditions).

Also in certain preferred embodiments, the recommendations include environmentally friendly recommendations. For example, in certain preferred embodiments, the processor 144 monitors emission values for the vehicles in the fleet and provides recommendations for limiting emission levels for the fleet of vehicles, for example as may be required or recommended for certain cities, harbors, and/or other geographic areas, along with other recommendations to reduce emissions, improve fuel consumption, and/or otherwise promote environmentally friendly recommendations and solutions. The recommendations also preferably include real-time recommendations or services to passengers.

In addition, in certain embodiments, the processor 144 provides recommendations or other information pertaining to various points of interest for the vehicle 102. For example, in one exemplary embodiment, the vehicle information pertaining to the first vehicle 102 includes a position or path of the first vehicle as well as one or more preferences of occupants of the first vehicle 102 as to one or more points of interest that may be near the position or path of the first vehicle 102, and the geographic information pertains information pertaining to such points of interest such as, by way of example only, locations of such points of interest, pricing for such points of interest, ratings or other substantive information pertaining to such points of interest, distances of such points of interest from the first vehicle 102's position or path, and/or various other different types of information pertaining to the points of interest. Also in this exemplary embodiment, the processor 144 provides recommendations for the first vehicle 102 that include a list of such points of interest, recommended points of interest, information pertaining thereto, and/or related information.

In the depicted embodiment, the open network 130 includes an application server 134. The application server is preferably operated by a plurality of operators 136. Specifically, the operators 136 utilize the application server 134 in implementing instructions (such as modifications to the vehicle health database 143 and/or the geographic database 142) from and/or providing information (such as the vehicle information, the vehicle health information, the geographic information, and/or the recommendations pertaining to the first vehicle 102 and/or one or more of the additional vehicles 104 and/or the fleet of vehicles as a whole) to one or more outside users interfacing with the control unit 108. In the depicted embodiment, the control unit 108 interfaces in this manner with outside users such as fleet managers 152, vehicle distributors 154, original equipment manufacturers (OEMs) 156, individual vehicle owners 158, and distributors 160 via an Internet 150 or other connection. However, this may vary in other embodiments. Also in a preferred embodiment, the application server 134 may also include one or more non-depicted processors; however, this may also vary in other embodiments.

The system aims at enforcing effective use of the resources and thus maximizing profits. As the owner can get the information anytime this system would cut down all the unwanted delays and enable the owner to take effective decision in advance. The ability to predict future occurrence of faults will save owners from unwanted expenses. He can aptly take actions during breakdown situation, passing on the best benefit to the customer. Fleet managers, vehicle dealers/owners, OEMs and distributors could also connect through internet to the centralized data populated by this network of vehicles, and receive recommendations provided by the control system and/or methods, software and/or program products used in connection therewith, for example through computer systems and/or the Internet, and thereby potentially allowing them to attain significant business benefits.

It will be appreciated that various features of the control system 100 may vary from that depicted in FIG. 1 and/or described herein in connection therewith. It will similarly be appreciated that, in the depicted embodiment, the reference to a first vehicle 102 and to additional vehicles 104 in the fleet is for illustrative purposes only. For example, in a preferred embodiment, similar vehicle information is also obtained from the additional vehicles 104 in the fleet by the control unit 108 in a similar fashion, and the control unit 108 likewise provides similar recommendations to each of the additional vehicles 104 in accordance with a preferred embodiment of the present invention. However, this may also vary in other embodiments.

Figure 2:
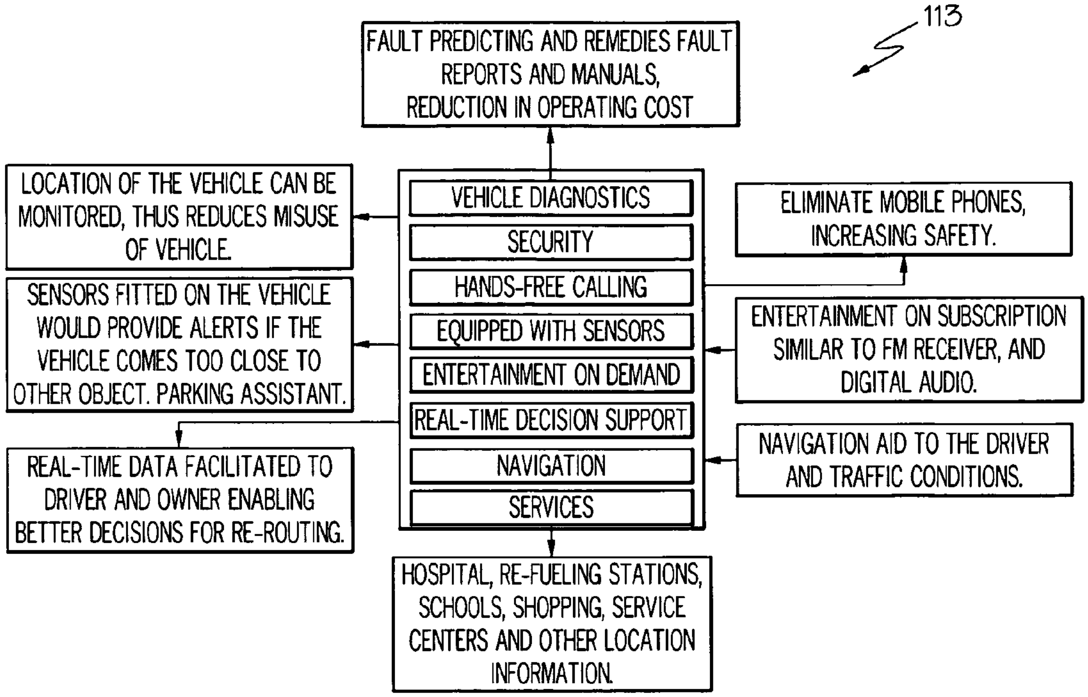
FIG. 2 is a functional block diagram of exemplary features of a smart device that can be used in connection with the control system of FIG. 1, in accordance with an exemplary embodiment of the present invention.

FIG. 2 is a functional block diagram of exemplary features of one of the smart devices 113 of FIG. 1 that can be used in connection with the control system of FIG. 1, in accordance with an exemplary embodiment of the present invention. As shown in FIG. 2, in a preferred embodiment, each smart device 113 is configured to provide vehicle diagnostics, security, hands-free calling, use of sensors (such as the sensors 114 depicted in FIG. 1 and described above in connection therewith), entertainment on demand, real-time decision support, navigation, and services for the occupants of the vehicle. For example, in a preferred embodiment, each smart device 113 is configured to provide recommendations from the control unit 108 as to the following, among other possible recommendations: fault predicting and remedies, fault reports and manuals, recommendations for reduction in operating costs, alternates to mobile phones (e.g. through hands-free calling and implementation of the recommendations), entertainment on subscription (e.g. similar to an FM receiver), digital audio, navigation to the driver and traffic conditions, recommendations and related information pertaining to hospitals, re-fueling stations, schools, shopping centers, service centers, and other location information and points of interest for the occupants of the vehicle, real-time data facilitated to the driver and owner enabling better decisions and also for re-routing as appropriate, sensors (such as the sensors 114 of FIG. 1) preferably fitted on the vehicle and that can assist in providing alerts if the vehicle comes too close to other objects as well as assisting in parking and other maneuvers, and monitoring of the location of the vehicle, among various other functions. It will be appreciated that the various functions may vary in other embodiments.

FIG. 3 is another functional block diagram of the control system 100 of FIG. 1, in accordance with another exemplary embodiment of the present invention. In the embodiment of FIG. 3, the base station 112 is connected to the first vehicle 102 and the additional vehicles 104 of the fleet via the wireless network. Essentially, the base station 112 functions as the control unit 108 of FIG. 1, and provides analysis and recommendations as to fuel life, air pressure, temperature, vehicle location, circuit health, engine faults, vehicle speed, nearby fuel station, and other nearby points of interest, among various other possible functions. As used in FIGS. 1 and 3 and described above, the base station 112 and the control room/unit 108 can be considered to collectively or individually perform the various tasks described herein in connection with one or more of these components. In certain embodiments, the base station 112 and/or the control room/unit 108 may comprise a single unit. In yet other embodiments, a separate base station 112 and control room/unit 108 may work in conjunction with one another to perform these various tasks.

Figure 4:
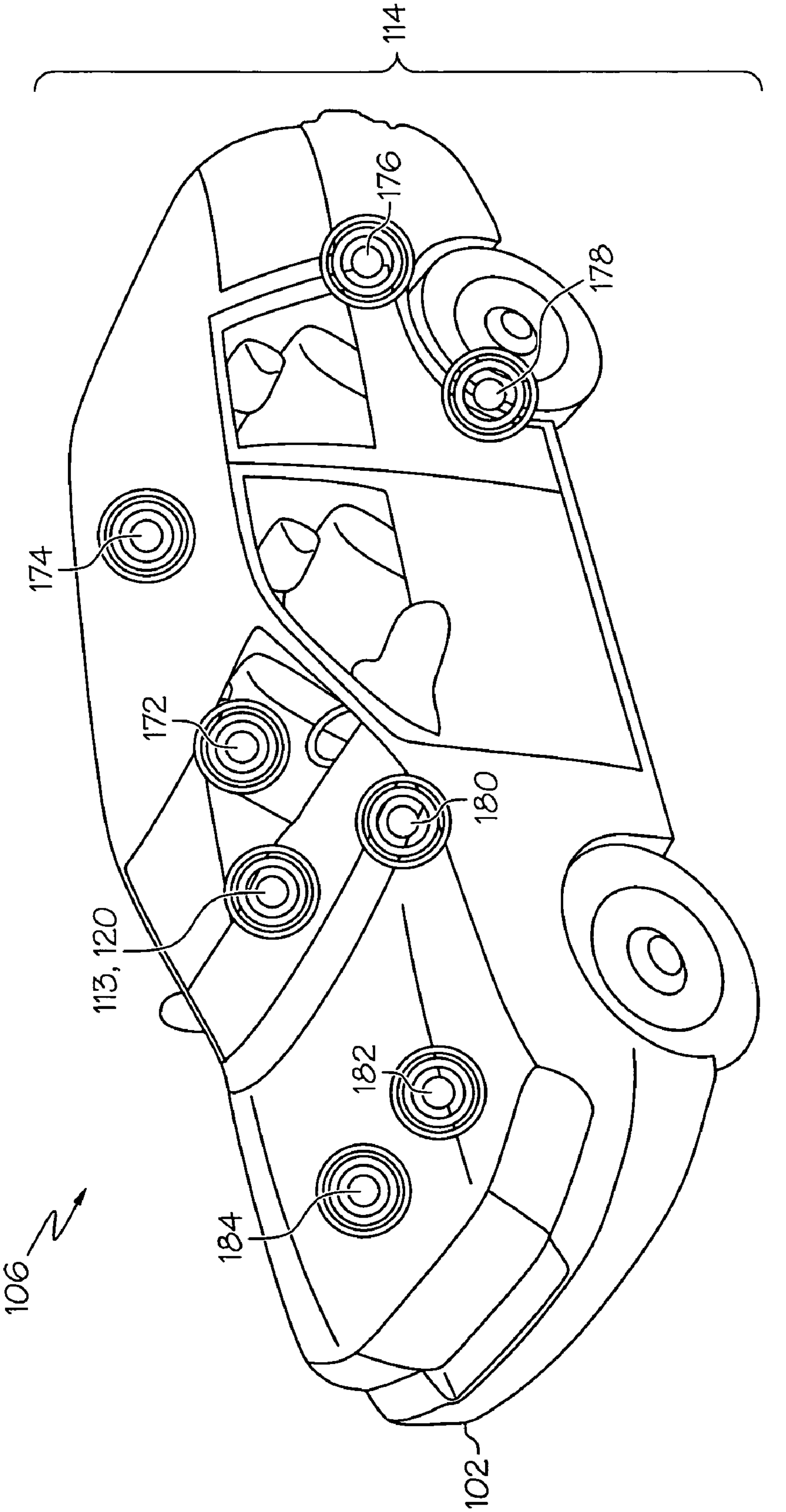
FIG. 4 is a schematic drawing illustrating placement of a detection unit of a vehicle in the fleet of vehicles that can be utilized in connection with the control system of FIG. 1, in accordance with an exemplary embodiment of the present invention.

FIG. 4 is a schematic drawing illustrating placement of a detection unit 106 of a vehicle in the fleet of vehicles that can be utilized in connection with the control system 100 of FIGS. 1-3, in accordance with an exemplary embodiment of the present invention. In the embodiment of FIG. 3, the smart device 113 and the display 120 both appear on the dash board of the first vehicle 102. In a preferred embodiment, the smart device 113 is a computer system, such as the computer system 200 of FIG. 5, that collects data from sensors and performs a first level of fault identification. In addition, in this depicted embodiment, the detection unit 106 comprises the following sensors 114, all as shown in FIG. 3: an internal circuit sensor 172 that detects values pertaining to the internal circuitry of the vehicle, a location sensor 174 used in obtaining values relating to a location of the vehicle, an emission level sensor 176 used in obtaining emission values of the vehicle, an air pressure 178 sensor used in obtaining values as to the air pressure of the vehicle, a fuel sensor 180 used in obtaining values as to an amount of fuel remaining in a fuel tank of the vehicle, an engine and transmission sensor 182 used in obtaining values pertaining to the operation of the engine and transmission systems of the vehicle, and a temperature sensor 184 used in obtaining one or more temperature values of the vehicle. While a detection unit is depicted in FIG. 4 only for the first vehicle 102 of the fleet of FIG. 1, the additional vehicles 104 of the fleet preferably include similar detection units 106 with similar sensors 114 in similar locations and that perform similar features. It will be appreciated that the various sensors 114 and/or other features of the detection units 106 for the various vehicles may differ in other embodiments.

Figure 5:
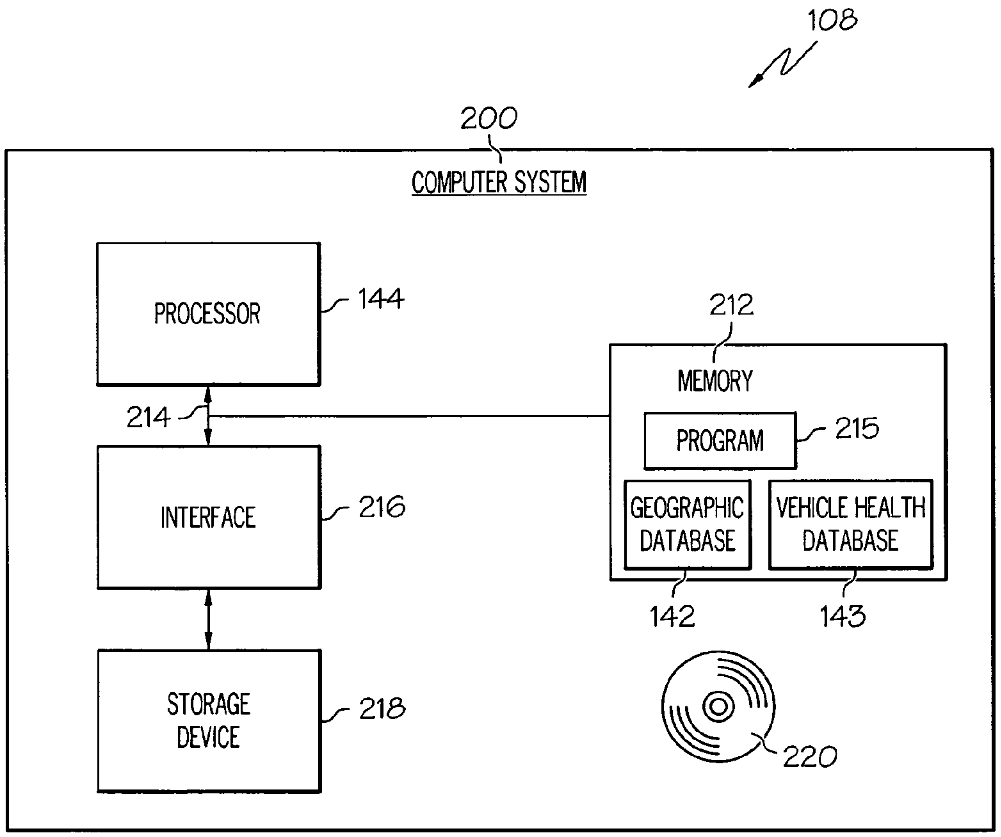
FIG. 5 is a functional block diagram of a computer system for controlling a fleet of vehicles, and that can be part of and/or used in connection with the control system of FIG. 1, in accordance with an exemplary embodiment of the present invention.

FIG. 5 is a functional block diagram of a computer system 200 for controlling a fleet of vehicles, and that can be part of and/or used in connection with the control system 100 of FIG. 1, in accordance with an exemplary embodiment of the present invention. For example, in certain exemplary embodiments, the control unit 108 of FIG. 1 comprises a computer system 200. In one exemplary embodiment, the isolated network 132 and the open network 130 of FIG. 1 each comprise a respective computer system 200. On other exemplary embodiments, the isolated network 132 and the open network 130 of FIG. 1 comprise a common computer system 200. In yet other exemplary embodiments, the isolated network 132 and the open network 130 of FIG. 1 are coupled to one or more computer systems 200.

In the depicted embodiment, the computer system 200 includes a processor 144, a memory 212, a computer bus 214, an interface 216, and a storage device 218. The processor 144 performs the computation and control functions of the computer system 200 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 144 executes one or more programs 215 preferably stored within the memory 212 and, as such, controls the general operation of the computer system 200.

In a preferred embodiment, the processor 144 is part of the centralized server 138 and performs the functions thereof. In other exemplary embodiments, the processor 144 is coupled to the centralized server 138. Preferably the processor 144 executes the steps of the isolated network 132 and the open network 130 of the control unit 108 in implementing one or more processes or steps thereof, such as the control process 300 depicted in FIG. 6 and described further below in connection therewith. In so doing, the processor 144 preferably executes one or more programs 215 stored in the memory 212.

As referenced above, the memory 212 stores a program or programs 215 that execute one or more embodiments of processes such as the control process 300 described below in connection with FIG. 6 and/or various steps thereof and/or other processes, such as those described elsewhere herein. The memory 212 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 212 may be a single type of memory component, or it may be composed of many different types of memory components. In addition, the memory 212 and the processor 144 may be distributed across several different computers that collectively comprise the computer system 200. For example, a portion of the memory 212 may reside on a computer within a particular apparatus or process, and another portion may reside on a remote computer. Also in a preferred embodiment, the memory 212 stores the above-referenced vehicle health database 143 and geographic database 142 of FIG. 1.

The computer bus 214 serves to transmit programs, data, status and other information or signals between the various components of the computer system 200. The computer bus 214 can be any suitable physical or logical means of connecting computer systems and components. This includes, but is not limited to, direct hard-wired connections, fiber optics, infrared and wireless bus technologies.

The interface 216 allows communication to the computer system 200, for example from a vehicle occupant, a system operator, and/or another computer system, and can be implemented using any suitable method and apparatus. The interface 216 can include one or more network interfaces to communicate within or to other systems or components, one or more terminal interfaces to communicate with technicians, and one or more storage interfaces to connect to storage apparatuses such as the storage device 218.

The storage device 218 can be any suitable type of storage apparatus, including direct access storage devices such as hard disk drives, flash systems, floppy disk drives and optical disk drives. In one exemplary embodiment, the storage device 218 is a program product from which memory 212 can receive a program 215 that executes one or more embodiments of the control process 300 of FIG. 6 and/or steps thereof as described in greater detail further below. In one preferred embodiment, such a program product can be implemented as part of, inserted into, or otherwise coupled to the control system 100. As shown in FIG. 5, the storage device 218 can comprise a disk drive device that uses disks 220 to store data. As one exemplary implementation, the computer system 200 may also utilize an Internet website, for example for providing or maintaining data through subscriptions or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 220), and transmission media such as digital and analog communication links. It will similarly be appreciated that the computer system 200 may also otherwise differ from the embodiment depicted in FIG. 5, for example in that the computer system 200 may be coupled to or may otherwise utilize one or more remote computer systems and/or other control systems.

Figure 6:
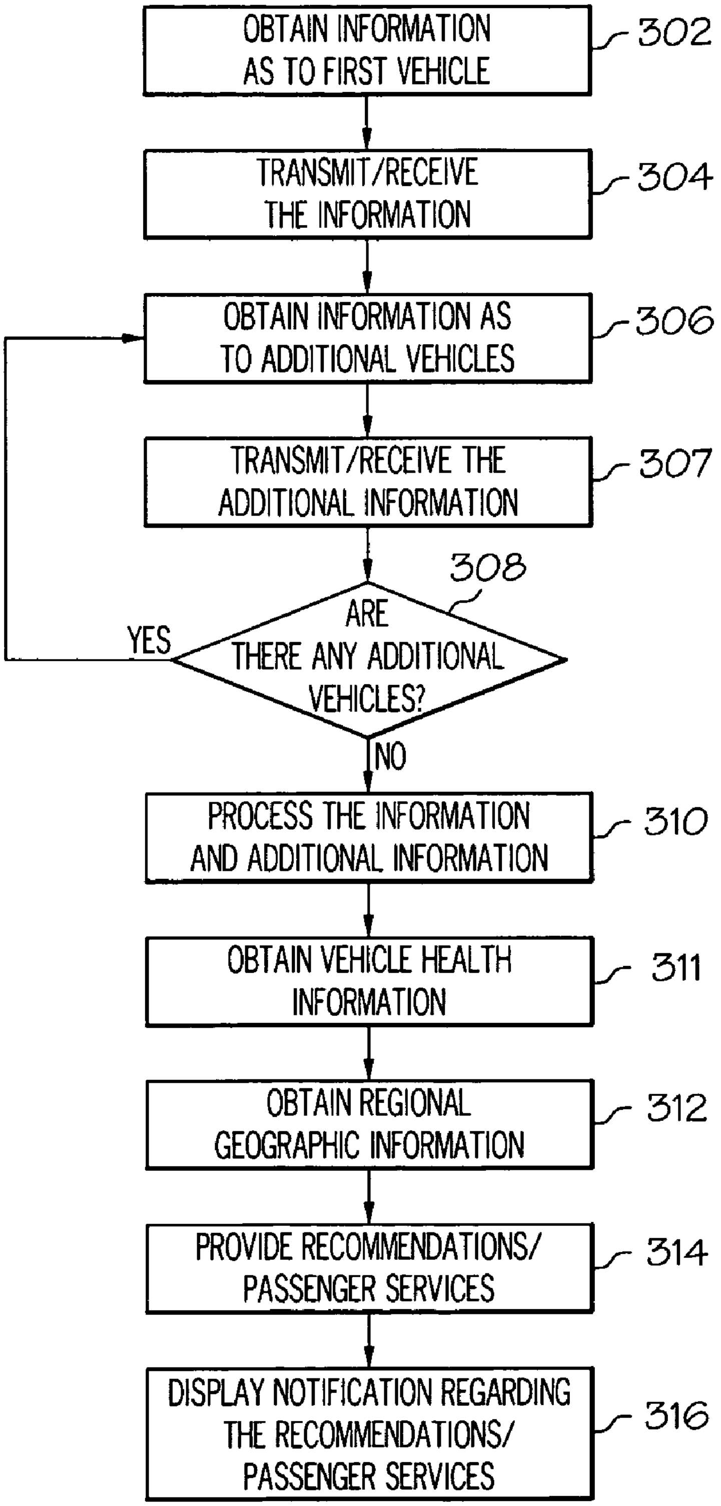
FIG. 6 is a flowchart of a control process for controlling a fleet of vehicles, and that can be used in connection with the control system of FIG. 1 and the computer system of FIG. 5, in accordance with an exemplary embodiment of the present invention.

FIG. 6 is a flowchart of a control process 300 for controlling a fleet of vehicles, in accordance with an exemplary embodiment of the present invention. The control process 300 can be used in connection with the control system 100 of FIG. 1 and the computer system 200 of FIG. 5, also in accordance with an exemplary embodiment of the present invention.

As depicted in FIG. 6, the control process 300 begins with the step of obtaining information as to a first vehicle in the fleet (step 302). In a preferred embodiment, this information corresponds with the vehicle information pertaining to the first vehicle 102 of FIG. 1 and described above. For example, in a preferred embodiment, this information comprises operating values for the vehicle, values pertaining to one or more operating conditions or symptoms, one or more parameters indicative of one or more measures of vehicle health, the exact geographic locations position of the vehicle, and/or various other values of the first vehicle 102 of FIG. 1. However, this may vary in other embodiments. Also in a preferred embodiment, this information is obtained by the detection unit 106 of FIG. 1 corresponding to the first vehicle 102 of FIG. 1. However, this may also vary in other embodiments.

The information obtained in step 302 regarding the first vehicle 102 is then transmitted and received (step 304). This information is transmitted by the detection unit 106 of the first vehicle 102 of FIG. 1 to the control unit 108 of FIG. 1 along the wireless network 110 of FIG. 1. In a preferred embodiment, this information is transmitted by the wireless radio 118 (most preferably by a transmitter 402 thereof) of the first vehicle 102 of FIG. 1 to the wireless radio 140 (most preferably by a receiver 504 thereof of FIG. 8) of the control unit 108 of FIG. 1. However, in other embodiments other transmitters and/or receivers may be used.

In addition, additional information is obtained as to an additional vehicle in the fleet (step 306). In a preferred embodiment, this additional information corresponds with the vehicle information pertaining to one of the additional vehicles 104 of FIG. 1 and described above. For example, in a preferred embodiment, this additional information comprises operating values for the vehicle, values pertaining to one or more operating conditions or symptoms, one or more parameters indicative of one or more measures of vehicle health, and/or various other values of this additional vehicle 104 of FIG. 1. However, this may vary in other embodiments. Also in a preferred embodiment, this additional information is obtained by the detection unit 106 of FIG. 1 corresponding to this additional vehicle 104 of FIG. 1. However, this may also vary in other embodiments.

The additional information obtained in step 306 regarding this additional vehicle 104 is then transmitted and received (step 307). This additional information is transmitted by the detection unit 106 of this additional vehicle 104 of FIG. 1 to the control unit 108 of FIG. 1 along the wireless network 110 of FIG. 1. In a preferred embodiment, this additional information is transmitted by a wireless radio 118 (most preferably by a transmitter 402 thereof) of this additional vehicle 104 of FIG. 1 to the wireless radio 140 (most preferably by a receiver 504 thereof of FIG. 8) of the control unit 108 of FIG. 1. However, in other embodiments other transmitters and/or receivers may be used.

A determination is then made as to whether there any additional vehicles in the fleet for which such additional information is to be obtained (step 308). This determination is preferably made by a processor, such as the processor 144 of FIGS. 1 and 3. If a determination is made that there are additional vehicles in the fleet for which such additional information is to be obtained, then the process returns to step 306, and steps 306-308 repeat until a determination is made in a subsequent iteration of step 308 that there are no additional vehicles in the fleet for which such additional information is to be obtained. The information and the additional information are preferably obtained in real time, and these steps are preferably continually repeated during operation of the vehicles in the fleet.

Once a determination is made in an iteration of step 308 that there are no additional vehicles in the fleet for which such additional information is to be obtained, the process then proceeds to step 310. In step 310, the above-referenced information and additional information is processed. In a preferred embodiment, the information and the additional information is processed by a processor, such as the processor 144 of FIGS. 1 and 3, in beginning to formulate control recommendations for the first vehicle 102 and each of the additional vehicles 104.

In addition, vehicle health information is preferably obtained (step 311). In a preferred embodiment, the vehicle health information includes maintenance records and operating and performance records for the entire fleet of vehicles stored in the vehicle health database 145 of FIG. 1, as described above in connection with FIG. 1. Other information pertaining to the health and/or maintenance of the vehicles and/or values pertaining thereto may also be utilized. Also in a preferred embodiment, the vehicle health information is retrieved from the vehicle health database 143 of FIGS. 1 and 3 (which, as mentioned above, is preferably stored in the memory 212 of FIG. 5) by the processor 144 of FIGS. 1 and 3 in step 311. However, this may vary in other embodiments.

Additionally, geographic information is also preferably obtained (step 312). In a preferred embodiment, the geographic information includes information as to geographic locations near the vehicles and/or their respective paths, such as service stations, repair shops, fuel pumps, hospitals, restaurants hotels, attractions, museums, sports venues, and/or other points of interest stored in the geographic database 142 of FIG. 1, as described above in connection with FIG. 1. Other data or information pertaining to a regional geographic area near the position or path of the vehicles in the fleet may also be utilized. Also in a preferred embodiment, the geographic information is retrieved from the geographic database 142 of FIG. 1 (which, as mentioned above, is preferably also stored in the memory 212 of FIG. 5) by the processor 144 of FIGS. 1 and 3 in step 311. However, this may also vary in other embodiments.

Next, recommendations are provided for the vehicles in the fleet. (step 314). As described above, in certain exemplary embodiments the In a preferred embodiment, the recommendations comprise one or more maintenance recommendations or recommended routes, or both, for the vehicles in the fleet based at least in part on the information as well as similar additional information. In certain embodiments, the recommendations may also include any number of other different types of vehicle health or maintenance recommendations. In addition, in certain embodiments, the recommendations may include recommendations or other information pertaining to points of interest for the occupants of the vehicle, such as nearby hotels, restaurants, museums, sports venues, hospitals, attractions, or other points of interest. In yet other embodiments, any number of various other different types of recommendations may be provided, separate from or in addition to those noted above.

Also in a preferred embodiment, the recommendations are provided by the control unit 108 (most preferably by the processor 144 thereof) based at least in part on the information, the additional information, the vehicle health information, and the geographic information. However, this may vary in certain embodiments. For example, certain recommendations for a particular vehicle may not be based on certain information or additional information from certain other vehicles in certain embodiments. In addition, in certain embodiments, the recommendations may not incorporate one or both of the vehicle health information or the geographic information. Other variations in the recommendations may also be utilized.

In addition, in a preferred embodiment, the recommendations are provided by the control unit 108 of FIG. 1 to the various vehicles in the fleet via transmission from the wireless radio 140 (preferably a transmitter 502 thereof of FIG. 8) of the control unit 108 of FIG. 1 along the wireless network 110 of FIG. 1 to the wireless radios 118 (preferably to receivers 404 thereof of FIG. 7) of the various vehicles of the fleet. However, other transmitters and/or receivers may also be used.

In addition, a notification is displayed regarding the recommendation (step 316). In a preferred embodiment, a separate notification is provided in the display 120 for each respective vehicle in the fleet pertaining to the recommendations pertaining to such vehicle. Also in a preferred embodiment, the notification includes information conveying the recommendation, such as a recommended nearby service station, a recommended maintenance service, a recommended route for continued travel, a recommended delay in travel, a recommended modification to the driving of the respective vehicle, a recommended nearby point of interest, and/or information pertaining thereto, among various other possible notifications.

It will be appreciated that certain steps of the control process 300 may vary in certain embodiments from those depicted in FIG. 6 and/or described herein in connection therewith. It will similarly be appreciated that certain steps of the control process 300 may occur simultaneously or in a different order that that depicted in FIG. 6 and/or described herein.

Accordingly, improved systems, program products, and methods are provided. The improved systems, program products, and methods provide for improved communications with and operation and control of vehicles in a fleet. The provided systems, program products, and methods utilize an overlay of real-time vehicle information along with vehicle health information and geographic that connect the vehicles of the fleet as a moving node on a wireless network, to thereby provide the information to provide the improved communications with and operation and control of the vehicles in the fleet. Preferably, the provided systems, program products, and methods help to provide real-time vehicle health management anytime-anywhere using Wi-Max connectivity. In addition the provided systems, program products, and methods also preferably facilitate effective health management with robust diagnostic models, reduce maintenance and repair cost, optimization of routing, uptime optimization and operational efficiency.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for controlling a fleet of vehicles, the system comprising:

a plurality of detection units, each detection unit configured to at least facilitate obtaining vehicle information as to a respective vehicle of the fleet; and a control unit coupled to the plurality of detection units and configured to at least facilitate providing one or more recommendations for a particular vehicle of the fleet, the one or more recommendations for the particular vehicle based on the vehicle information for the particular vehicle and upon additional vehicle information for one or more other vehicles in the fleet.

2. The system of claim 1, wherein each the plurality of detection units are configured to at least facilitate obtaining the vehicle information as to one of the vehicles of the fleet in real time.

3. The system of claim 1, wherein the control unit is also coupled to a geographic database of geographic data and is configured to at least facilitate providing the recommendation for the particular vehicle based on the vehicle information for that particular vehicle, the additional vehicle information for one or more other vehicles in the fleet, and the geographic data.

4. The system of claim 1, wherein:

the detection unit of each respective vehicle in the fleet comprises:

a sensor configured to at least facilitate obtaining the vehicle information regarding the respective vehicle; and a transmitter coupled to the sensor and configured to at least facilitate transmitting a signal to the control unit based at least in part thereon; and the control unit comprises:

a control receiver coupled to the plurality of vehicle transmitters and configured to at least facilitate obtaining the signals therefrom;

a memory storing an operational history database of data pertaining to an operational history of each of the vehicles of the fleet of vehicles; and a processor coupled to the control receiver and the memory, the processor configured to at least facilitate provide the one or more recommendations based at least in part on the signals and the operational history of one or more other vehicles in the fleet.

5. The system of claim 1, wherein the control unit is configured to provide a maintenance recommendation for the particular vehicle based at least in part on a current symptom of the particular vehicle and a symptom of one or more of the other vehicles of the fleet.

6. The system of claim 4, further comprising:

a plurality of vehicle receivers coupled to the control unit and configured to receive one or more of the recommendations therefrom pertaining to a respective one of the vehicles of the fleet; and a plurality of vehicle displays coupled to the plurality of vehicle receivers, each vehicle display coupled to the vehicle receiver corresponding to a particular one of the vehicles of the fleet and configured to display a notification to one or more users of the vehicle based at least in part on the one or more recommendations pertaining to the particular vehicle.

7. The system of claim 3, wherein the control unit is configured to provide a recommended route for the particular vehicle based at least in part on a portion of the geographic data pertaining to the particular vehicle and a condition encountered by one or more of the other vehicles in the fleet.

8. The system of claim 1, wherein the one or more recommendations for the particular vehicle is based at least in part on a symptom of one or more other vehicles in the fleet.

9. A method for controlling a fleet of vehicles, the method comprising:

obtaining vehicle information as to a particular vehicle in the fleet;

obtaining additional information as to additional vehicles in the fleet;

transmitting the vehicle information and the additional information to a control unit via a wireless network; and providing one or more recommendations for the particular vehicle based at least in part on the vehicle information and the additional information.

10. The method of claim 9, wherein the step of obtaining the vehicle information as to the particular vehicle in the fleet comprises the step of obtaining the vehicle information as to the particular vehicle in the fleet in real time.

11. The method of claim 9, further comprising the steps of:

obtaining geographic data from a geographic database; and providing the recommendation for the particular vehicle based on the vehicle information for that particular vehicle, the additional vehicle information for one or more other vehicles in the fleet, and the geographic data.

12. The method of claim 9, wherein the step of providing one or more recommendations comprises the step of providing a maintenance recommendation for the particular vehicle based at least in part on a current symptom of the particular vehicle and a symptom of one or more of the other vehicles of the fleet.

13. The method of claim 11, further comprising the step of:

providing a recommended route for the particular vehicle based at least in part on a portion of the geographic data pertaining to the particular vehicle and a condition encountered by one or more of the other vehicles in the fleet.

14. The method of claim 9, further comprising the step of:

providing the one or more recommendations for the particular vehicle based on a symptom of the particular vehicle and an operational history of one or more other vehicles in the fleet.

15. A program product for controlling a fleet of vehicles, the program product comprising:

a program configured to at least facilitate:

obtaining vehicle information as to a particular vehicle in the fleet;

obtaining additional information as to additional vehicles in the fleet;

transmitting the vehicle information and the additional information to a control unit via a wireless network; and providing one or more recommendations for the vehicle based at least in part on the vehicle information and the additional information; and a computer-readable signal bearing media bearing the program.

16. The program product of claim 15, wherein the program is further configured to at least facilitate:

monitoring emission values for the vehicles in the fleet; and providing real-time recommendations for limiting emissions based on the monitored emission values.

17. The program product of claim 15, wherein the program is further configured to at least facilitate:

obtaining data from a geographic database; and providing the recommendation for the particular vehicle based on the vehicle information for that particular vehicle, the additional vehicle information for one or more other vehicles in the fleet, and the geographic data.

18. The program product of claim 15, wherein the program is further configured to at least facilitate providing a maintenance recommendation for the vehicle based at least in part on a current symptom of the particular vehicle and a symptom of one or more of the other vehicles of the fleet.

19. The program product of claim 17, wherein the program is further configured to at least facilitate providing a recommended route for the particular vehicle based at least in part on a portion of the geographic data pertaining to the particular vehicle and a condition encountered by one or more of the other vehicles in the fleet.

20. The program product of claim 15, wherein the program is further configured to at least facilitate providing the one or more recommendations for the particular vehicle based on a symptom of the particular vehicle and an operational history of one or more other vehicles in the fleet.

* * * * *